United States Patent
Holzl (10) Patent No.: US 9,841,274 B2
(45) Date of Patent: Dec. 12, 2017

(54) DEVICE FOR DETERMINING THE LOCATION OF MECHANICAL ELEMENTS

(71) Applicant: Pruftechnik Dieter Busch AG, Ismaning (DE)

(72) Inventor: Roland Holzl, Munich (DE)

(73) Assignee: PRUFTECHNIK DIETER BUSCH AG, Ismaning (DE)

( * ) Notice: Subject to any disclaimer, the term of this patent is extended or adjusted under 35 U.S.C. 154(b) by 310 days.

(21) Appl. No.: 14/257,790

(22) Filed: Apr. 21, 2014

(65) Prior Publication Data

US 2014/0327762 A1  Nov. 6, 2014

(30) Foreign Application Priority Data

May 6, 2013 (DE) ........................ 10 2013 007 661

(51) Int. Cl.
| | | |
|---|---|---|
| *G01B 11/14* | (2006.01) | |
| *H04N 5/232* | (2006.01) | |
| *G01B 11/27* | (2006.01) | |

(52) U.S. Cl.
CPC ............ *G01B 11/14* (2013.01); *G01B 11/272* (2013.01); *H04N 5/23229* (2013.01)

(58) Field of Classification Search
CPC ................................ G01B 11/14; H04N 5/232
See application file for complete search history.

(56) References Cited

U.S. PATENT DOCUMENTS

| 6,411,375 B1* | 6/2002 | Hinkle ................. G01B 11/272 33/286 |
| 6,476,914 B1* | 11/2002 | Hoelzl .................. G01B 11/26 250/208.2 |
| 6,873,931 B1 | 3/2005 | Nower et al. |
| 2002/0063859 A1* | 5/2002 | Hermann ............. G01B 11/272 356/153 |
| 2007/0201040 A1 | 8/2007 | Konetschny et al. |

FOREIGN PATENT DOCUMENTS

| DE | 3814466 A1 | 11/1989 |
| DE | 4041723 A1 | 6/1992 |
| DE | 3335336 A1 | 4/1994 |

(Continued)

*Primary Examiner* — Dave Czekaj
*Assistant Examiner* — Berteau Joisil
(74) *Attorney, Agent, or Firm* — Barlow, Josephs & Holmes, Ltd.

(57) ABSTRACT

The invention relates to a device for determining the location of a first mechanical element (10, 156) and a second mechanical element (12, 154) with respect to each other, with a first measurement unit (14, 114, 214) for positioning at the first mechanical element, a second measurement unit (18, 118, 218) for positioning at the second mechanical element, and an analysis unit (22), wherein the first measurement unit has means (24, 124, 224) for producing a light beam bundle (28, 128, 228), wherein the second measurement unit has a scattering surface (34, 134, 234) for scattering of the light impinging on the scattering surface, a camera (36), and means for imaging the scattering surface on the camera, wherein the scattering surface faces the first measurement unit when the measurement units are positioned at the respective mechanical element so as to be impinged on by the light beam bundle.

15 Claims, 9 Drawing Sheets

(56) References Cited

FOREIGN PATENT DOCUMENTS

| | | |
|---|---:|---:|
| DE | 19747872 A1 | 5/1999 |
| DE | 10117390 A1 | 10/2002 |
| DE | 10143812 A1 | 3/2003 |
| DE | 10252082 A1 | 5/2004 |
| DE | 10352719 A1 | 6/2005 |
| DE | 102008037176 A1 | 3/2010 |
| EP | 0543971 A1 | 6/1993 |
| EP | 1211480 A2 | 10/2001 |
| EP | 1473540 A1 | 11/2004 |
| EP | 2093537 A1 | 2/2009 |
| WO | 9736146 A1 | 10/1997 |
| WO | 0028275 A1 | 5/2000 |
| WO | 03067187 A1 | 8/2003 |
| WO | 2010042039 A1 | 4/2010 |

\* cited by examiner

DEVICE FOR DETERMINING THE LOCATION OF MECHANICAL ELEMENTS

BACKGROUND OF THE INVENTION

The invention relates to a device for determining the location of a first mechanical element and a second mechanical element with respect to each other, with a first measurement unit for positioning at the first mechanical element and a second measurement unit for positioning at the second mechanical element as well as an analysis unit, with at least one of the two measurement units having a light source for producing a light beam whose point of impingement on at least one surface at the other measurement unit is determined.

Such a device can be designed, for example, for determining the alignment of two shafts with respect to each other, for determining the straightness or aligned orientation of bores, for determining the straightness of edges, or for level determination of various points of a surface.

Typically, for determining the alignment of shafts with respect to each other, the location of the point of impingement of the light beam is determined in a plurality of rotational angle positions, for which purpose the measurement units are displaced along the peripheral surfaces of the shafts or the shafts are rotated together with the measurement units positioned at the peripheral surfaces.

Described in DE 33 35 336 A1 is a shaft alignment measurement device in which both the first measurement unit and the second measurement unit each emit a light beam and each has an optical detector, with the light beam in each case being directed onto the detector of the other measurement unit.

A shaft alignment measurement device operating according to this principle is also described in U.S. Pat. No. 6,873,931 B1, with the two measurement units each being provided with two biaxial acceleration sensors for automatically detecting the rotational angle of the shaft.

Known from DE 38 14 466 A1 is a shaft alignment measurement device in which the first measurement unit emits a light beam, which impinges on two optical detectors of the second measurement unit, which are arranged behind one another in the axial direction.

Known from WO 03/067187 A1 is a shaft alignment measurement device in which the first measurement unit emits a fan-shaped beam, which impinges on two optical detectors of the second measurement unit, which are arranged behind one another in the axial direction.

Known from WO 00/28275 A1 is a shaft alignment measurement device in which two measurement units are attached to a front side of each of the two shafts, with the first measurement unit emitting a fan-shaped light beam, which impinges laterally on three marker pins arranged in a plane of the second measurement device.

Described in EP 2 093 537 A1 is a shaft alignment measurement device in which the first measurement unit emits a fanned-out light beam, which impinges on two optical strip detectors of the second measurement unit, which are arranged laterally spaced and parallel to each other, with the lengthwise direction of the detectors being arranged perpendicularly to the fanned plane of the light beam.

Described in EP 0 543 971 B1 is a device for determining the alignment of a turbine bore with respect to a reference axis, with a laser beam representing the reference axis being directed onto a biaxial optical detector, which has a foot that is placed against the bore wall and is shifted along the latter in the peripheral direction in order to determine the point of impingement of the laser at a plurality of rotational angles.

Described in US 2007/0201040 A1 is a device for determining the level of a plurality of measurement points on a surface, with a laser beam that rotates in a horizontal plane at constant angular speed is directed onto a biaxial optical detector positioned at the respective measurement point in order to determine the height of the measurement point from the vertical component of the point of impingement and to determine the angle and the distance of the measurement point with respect to the laser source from the time point and time duration of the horizontal sweep of the detector. A similar device is described in EP 1 473 540 A1, with the laser beam being directed onto the detector by means of a rotating pentagonal prism and having an intensity profile that depends on a rotational angle, on the basis of which the angle of the measurement point can be determined.

For all of the measurement devices assessed here, the point of impingement of a light beam on a detector surface is determined and analyzed in each case.

Known from DE 40 41 723 A1 is a device for determining the position of a measurement point relative to a reference point for guiding or controlling the advance of a bore, said device having a plurality of measurement stations, which are arranged in the bore or at the bore head and each of which has a camera with a marking, with each camera recording the marking of the adjacent camera or measurement station.

Known from WO 2010/042039 A1 is a shaft alignment measurement device in which each of the two measurement units is provided with a camera arranged in a housing, with the side of the housing facing the other unit being provided with an optical pattern, which is recorded by the opposite-lying camera. The side of the housing provided with the pattern is provided in each case with an opening, through which the opposite-lying pattern is imaged. In an alternative design, one of the two units is provided only with a camera, but not with a pattern, whereas the other unit does not have a camera, but is provided with a three-dimensional pattern.

Described in EP 1 211 480 A2 is a shaft alignment measurement device in which the first measurement unit is provided with a light source, which directs a light beam onto the second measurement unit, which is provided with a matt screen; the side of the matt screen facing away from the first measurement unit is imaged by means of appropriate optics onto an image detector also forming a part of the second measurement unit.

Described in DE 101 43 812 A1 and DE 101 17 390 A1 is a shaft alignment measurement device in which the first measurement unit has a light source for producing a fanned-out beam and the opposite-lying second measurement unit has a partially reflecting optical system with a rearward matt screen and a camera, which records the side of the matt screen facing away from the first measurement unit with a primary light spot of the beam coming directly from the light source and with a secondary light spot of the beam reflected from the partially reflecting optical system of the second measurement unit and a reflector on the front side of the first measurement unit.

A laser receiver with camera for machine measurement is available from the company Wente CamSorik GmbH, 38108 Braunschweig, Germany, under the trade name LaserTrac.

SUMMARY OF THE INVENTION

The problem of the present invention is to create a device for determining the location of two mechanical elements with respect to each other, for example, for shaft alignment measurement, the design of said device being especially simple, flexible, and low cost. A further problem of the invention is to create a corresponding method.

This problem is solved by the device and method of the present invention.

In the solution according to the invention, it is advantageous that, through the use of a camera and a scattering surface that is imaged on the camera, instead of using an optical detector on which the reflected light beam bundle impinges directly, an especially simple and flexible system can be realized. In particular, it is possible to use as camera a mass-produced product designed for end users, such as, for example, a photographic camera or a smartphone, which may be obtained at relatively low cost or is already available anyhow to the user for other reasons.

According to an embodiment of the invention, the camera can move freely with respect to the two measurement units and can be used in a freehand manner, for example, in order to image the scattering surface onto the camera. According to an alternative embodiment, the camera can be designed as part of the measurement unit, which also has means for producing the light beam bundle, or it can be attached to this measurement unit.

The invention can be used in particular for determining the alignment of two shafts with respect to each other, for determining the straightness or aligned orientation of bores, for determining the straightness of edges, or for level determination of various point of a surface.

BRIEF DESCRIPTION OF THE DRAWINGS

The invention will be explained in more detail below on the basis of the attached drawings. Shown are.

DETAILED DESCRIPTION OF THE INVENTION

Figure 1:
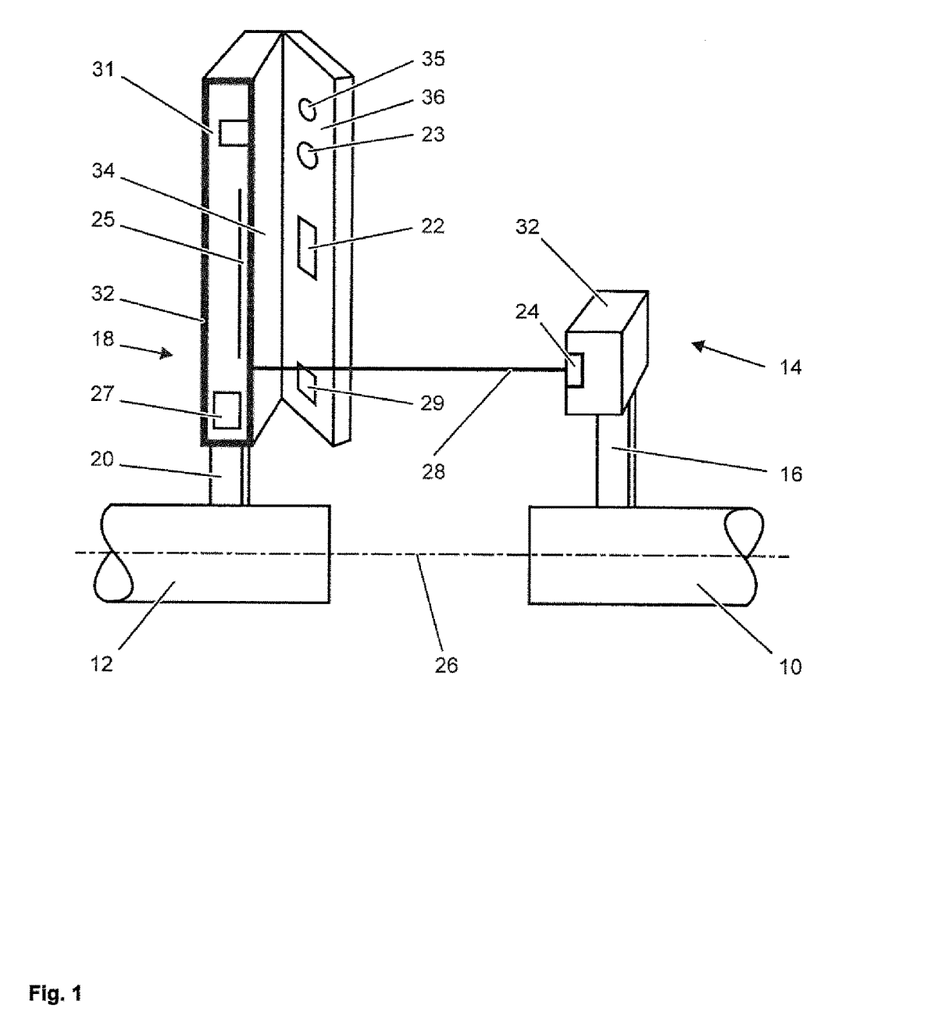
FIG. 1 a lateral, slightly perspective view of a first example of a location determination device according to the invention.
Figure 2:
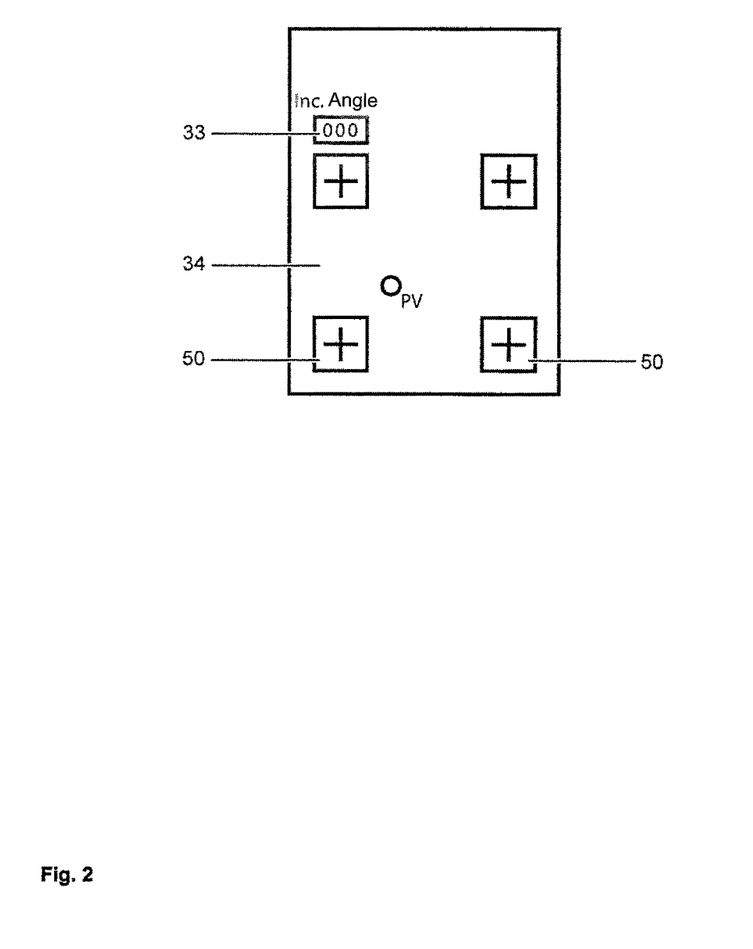
FIG. 2 a front view of the scattering surface of the device of the device of FIG. 1.
Figure 3:
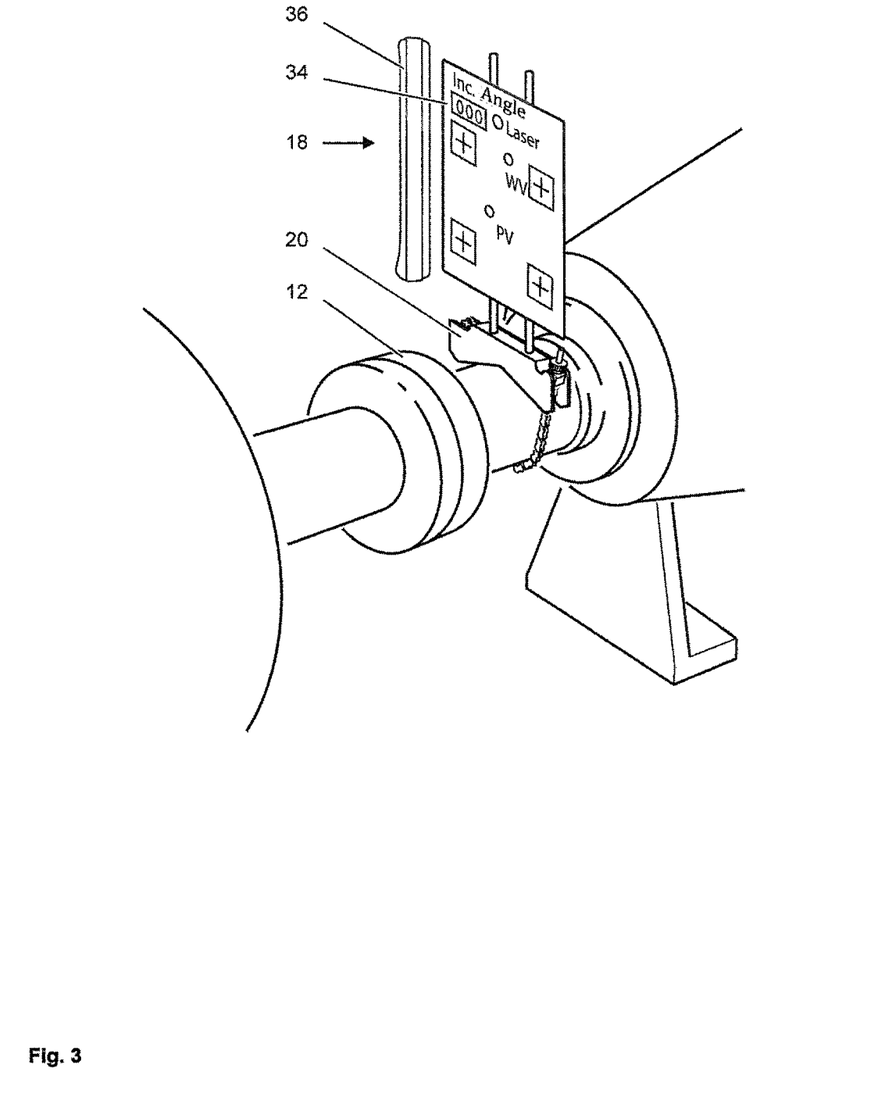
FIG. 3 a perspective view of the measurement unit of the device of FIG. 1, provided with the scattering surface, in practical use.

Shown in FIGS. 1 to 3 is a first example of a device according to the invention for determining the alignment of a first shaft 10 of a machine (not shown) and a second shaft 12 of a machine (not shown) with respect to each other. The device comprises a first measurement unit 14 with an element 16 for positioning at a peripheral surface of the first shaft 10 as well as a second measurement unit 18 with an element 20 for positioning at the peripheral surface of the second shaft 12.

The two shafts 10 and 12 are arranged behind one another aligned as much as possible with respect to a reference axis 26, with the device having the two measurement units 14, 18 serving to determine any angular offset and/or parallel offset with respect to the reference axis 26 or with respect to each other. Typically, the device also comprises means for displaying the result regarding angular offset or parallel offset (not illustrated in the figures).

The first measurement unit 14 comprises a light source 24 for producing a light beam bundle 28, a collimator (not illustrated) for collimating the light beam bundle 28.

The second measurement unit 18 comprises a scattering surface 34 and a camera 36 for taking pictures of the scattering surface 34.

The camera 36 has optics 35 in order to image the scattering surface 34 onto a camera sensor (not illustrated). The camera 36 can be attached at a lateral angle obliquely to the scattering surface 34, for example, so as not to prevent the impingement of a light beam emitted at the first measurement unit 14, at least in the central region of the scattering surface 34.

The scattering surface 34 faces the first measurement unit 14 when the two measurement units 14, 18 are situated in a measurement position.

In the example of FIG. 1 and FIG. 2, the point of impingement (that is, the light spot) of the light beam bundle 28 on the scattering surface 34 is labeled PV.

The first measurement unit 14 has a housing 32, which contains the light source 24 and the associated electronics. The light source 24 preferably is pulsed in a randomized manner in order to minimize any oscillation sensitivity. Furthermore, the housing 32 contains the power source (batteries or rechargeable batteries) for the light source 24 in addition to suitable power management electronics. Overall, the housing 32 should not be appreciably thicker than the holding rods typically provided for attachment to the positioning element 16 (not shown in FIG. 1).

Behind the scattering surface 34 (as viewed from the first measurement unit 14), the second measurement unit 18 has a housing 27, which can accommodate an inclinometer 31, for example, to determine the angle of inclination of the second measurement unit 18 and hence the rotational angle position of the shaft 10 provided with the second measurement unit 18. Such an inclinometer 31 with a display 33 can be integrated in the housing 27, for example; see FIGS. 1 and 2. In this case, the inclinometer 31 can be designed, for example, as an MEMS inclinometer.

The first measurement unit 14 is preferably designed such that the light beam bundle 28 can be directed without interposition of a reflecting element onto the scattering surface 34 of the second measurement unit 18: that is, no reflecting elements are arranged between the light source 24 and the scattering surface 34.

According to FIG. 2, the scattering surface 34 is provided with measurement markings 50, which can be designed as crosses, for example, in order to facilitate the analysis of the images of the scattering surface 34 taken by the camera 36. In order that the markings 50 are also visible in darker surroundings, it is possible to provide an external light source, for example, such as an LED 23, on the camera 36. Alternatively, a backlighting 25 of the scattering surface 34 could be provided. In this case, a metal foil with appropriate cutouts could be attached adhesively to a milk glass surface (made of glass or plastic), with injection of diffuse white light via the housing 32.

Preferably, the scattering surface 34 is designed to be essentially flat. According to FIGS. 1 and 3, the camera 36 can be arranged laterally displaced and tilted with respect to the scattering surface 34. In this case, the camera 36 can also be mounted, for example, below on the positioning element 16 (which can be a chain tensioning device, for example). The camera 36 is oriented in this case so that it images the scattering surface 34 as completely as possible on the camera sensor, but the light beam bundle 28 is not shadowed. In this case, a scattered light aperture (not shown) could also be provided, which could be used advantageously also for mechanical stabilization of the camera 36 and the scattering surface 34.

The camera 36 can be designed, for example, as a compact camera or as a smartphone or mobile phone camera. Preferably, the optics 35 involve a fixed lens, because such a lens is more stable than a zoom lens. Preferably, the resolution of the camera sensor is at least 8 megapixels. The camera is operated preferably in the macro setting.

Insofar as the camera is designed as a smartphone, the display of the smartphone can be used advantageously as a graphic user interface (GUI); otherwise, an additional device of this kind, such as, for example, a smartphone or a tablet computer, could be used additionally for user control. In this case, it is possible to also use, for example, voice control with a headset or the "Google Glass" expected in 2013.

The analysis of the images taken by the camera can be carried out as follows: The goal of the analysis is to determine the midpoint coordinates of the point of impingement PV of the light beam bundle 28. In this process, the image taken is initially rectified; that is, the perspective distortions and any distortions of the optical system caused by the laterally tilted arrangement of the camera 36 will be compensated for. This can occur, for example, on the basis of measurement markings 50, the "global coordinates" of which are known exactly. The point of impingement of the light beam bundle 28 can be separated from the background on the basis of color, so that the region for the middle point determination is limited. The midpoint determination by means of a center-of-gravity estimation then occurs. Because the global coordinates of the measurement markings 50 are known exactly, the pixel coordinates can be calculated, so that the midpoint of the points of impingement WV and PV of the light beam bundles can be determined in global coordinates.

Figure 4:
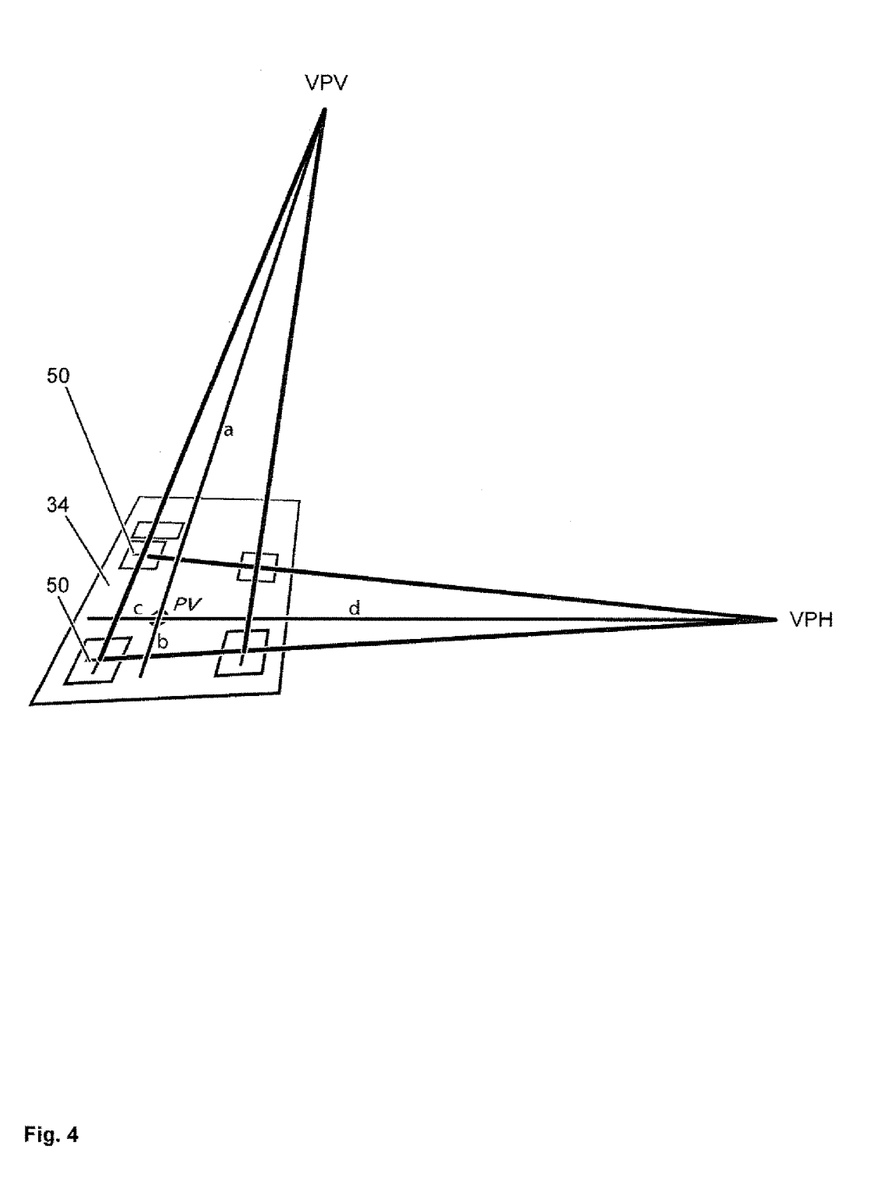
FIG. 4 a schematic illustration of how the intercept theorem can be used to correct a perspective distortion of the image of the scattering surface on the camera.

Another possibility is the use of the intercept theorem to calculate the coordinates of the points of impingement, as is indicated schematically for the point of impingement PV in FIG. 4. In this case, the horizontal vanishing point VPH and the vertical vanishing point VPV are used.

It is also possible to determine the mean diameter of the point of impingement PV of the light beam bundle and to use it to estimate the distance between the light source 24 and the scattering surface 34, that is, between the first measurement unit 14 and the second measurement unit 18.

Insofar as the second measurement unit 18 has a display 33 for the angle of inclination measured by an inclinometer 31, the camera 36 is preferably provided with an OCR function in order to register the value of this angle; alternatively, a transmission of the angle value directly to the camera 36 can occur via, for example, a Bluetooth link.

Insofar as the camera 36 is a smartphone, the inclinometer 29 that is usually integrated in it can also be used for determining the angle of inclination.

The analysis of the images can be conducted in an analysis unit indicated schematically by 22, which can constitute a part of the camera, particularly when what is involved is a smartphone, which is inherently already factory-equipped anyhow with a relatively large computing power.

Prior to start of a measurement, the two measurement units 14, 18 are initially adjusted with respect to each other so that the light beam bundle 28 impinges roughly at the center of the scattering surface 34. For this purpose, the first measurement unit 14, for example, can be provided with a height adjuster (not shown) for shifting the position of the first measurement unit 14 in the radial direction with respect to the shaft 10 and an angle adjuster for tilting the first measurement unit 14 with respect to the radial direction of the shaft 10 and an adjustment of the first measurement unit 14 around the radial direction.

Once adjustment of the two measurement units 14, 18 with respect to each other has been completed, the position of impingement of the beam bundle 28 can be drawn on for the misalignment of the two shafts 10 and 12 with respect to each other, when the two shafts 10 and 12, together with the measurement units 14, 18 situated on them, are rotated around the axis 26, with the course of the respective point of impingement then being followed depending on the rotational angle (which, in turn, can be determined by means of the inclinometer function) and being analyzed in the known way so as to draw conclusions about the vertical offset, horizontal offset, and the angular offset of the shafts 10, 12 (such a method is described, for example, in EP 1 211 480 A2 or WO 98/33039 A1).

After determination of the misalignment, an adjustment of the shafts 10, 12 is performed in a specific angular position, with measurement being conducted during the shaft adjustment in order to establish when the misalignment is best corrected.

Typically, during the alignment measurement and during the adjustment of the shafts, images of the scattering surface 34 are to be taken and analyzed continually by the camera at a relative high rate, with it being possible to produce and process five images per second, for example. Insofar as the camera is a smartphone, the taking and analysis of images can be carried out in the form of an appropriate app, for example.

As alternative to continually taking images, the image-taking mode can also be chosen, for example, so that images are taken depending on the current angle of inclination, for example whenever the angle is altered by a specific increment—for example, 1°.

The alignment device can optionally comprise a Bluetooth headset, which is worn by the operator carrying out the adjustment of the shafts during the adjustment and which serves for wireless reception of the current offset values determined by analysis unit 22 of the camera 36, designed as a smartphone, so as to serve audibly the person carrying out the adjustment of the shafts. This is insofar advantageous as, during the adjustment, it is typically difficult for the operator to read the display of the smartphone 36. In this case, the headset could also be used in order to utilize the Bluetooth link for voice control of the smartphone 36.

Alternatively, a second smartphone or a tablet computer could be used by the operator in order to present the display of the smartphone 36 serving as the camera via a Bluetooth link (for example, by means of VNC) in a form that can be better read by the operator, with it also being possible to control the smartphone 36 via the second smartphone or the tablet computer by means of touch display; see also WO 97/36146.

Typically, the imaged surface has a size of about 40×40 mm, in which case one pixel corresponds to about 20 μm when the resolution of the camera is 8 megapixels (corresponding to a vertical resolution of about 2500 pixels). When a compact camera with 16 megapixels, for example, is used, a resolution of about 7 μm can be achieved.

It is basically possible also to use a camera with special optics or, in the case of a smartphone, to use an interposed magnifier. The dimensions of the scattering surface 34 to be imaged can also be reduced, for example, to 20×20 mm to 30×30 mm.

In this case, it is basically conceivable for the images of the camera to be transmitted wirelessly (for example, via WLAN) to a mobile platform, for example. It is possible here to use a special SD card, for example.

According to a modification of the embodiment of FIGS. 1 to 3, the camera 36 can be designed as a "free camera," which can move freely with respect to the two measurement units 14, 18 and is held in the hand of the operator for taking the picture of the scattering surface 34, for example, or else mounted on a tripod. In this case, the camera can be operated either in the macro setting and positioned appropriately close to the scattering surface 34 when pictures are taken or else, where this is not possible or not desired, the camera is operated with a telephoto lens, so that images can also be taken at a distance of greater than 1 m, for example.

Basically, the camera can be joined to the first measurement unit 14, even in cases in which, during recording, it is mounted on the first measurement unit 14 in a fixed position, in such a way that after alignment measurement and adjustment have been completed, it can be detached from the first measurement unit 14 and used elsewhere. This is particularly advantageous in the case when the camera is a smartphone.

Basically, the use of smartphones as camera offers many advantages: Thus, such devices are very flexible and powerful in terms of programming and design of the graphic user interface; in particular, things such as gesture recognition, keyboard overlay, and localization are possible. Furthermore, the user carrying out the alignment measurement can use a device whose operation he is already basically familiar with anyhow. Moreover, smartphones offer many interfaces, such as, for example, also those in a maintainer database; in particular, in this case, wireless interfaces are available, which can be used for linking to another mobile operating platform, a headset (with echo and noise suppression), Google Glass, a vibrating belt, etc. Furthermore, the smartphone can be used in the usual way at times when it is not used for alignment measurement.

The measurement units 10, 12 can be used not only for shaft alignment, but, in appropriate modification, for other location determination methods.

Figure 5:
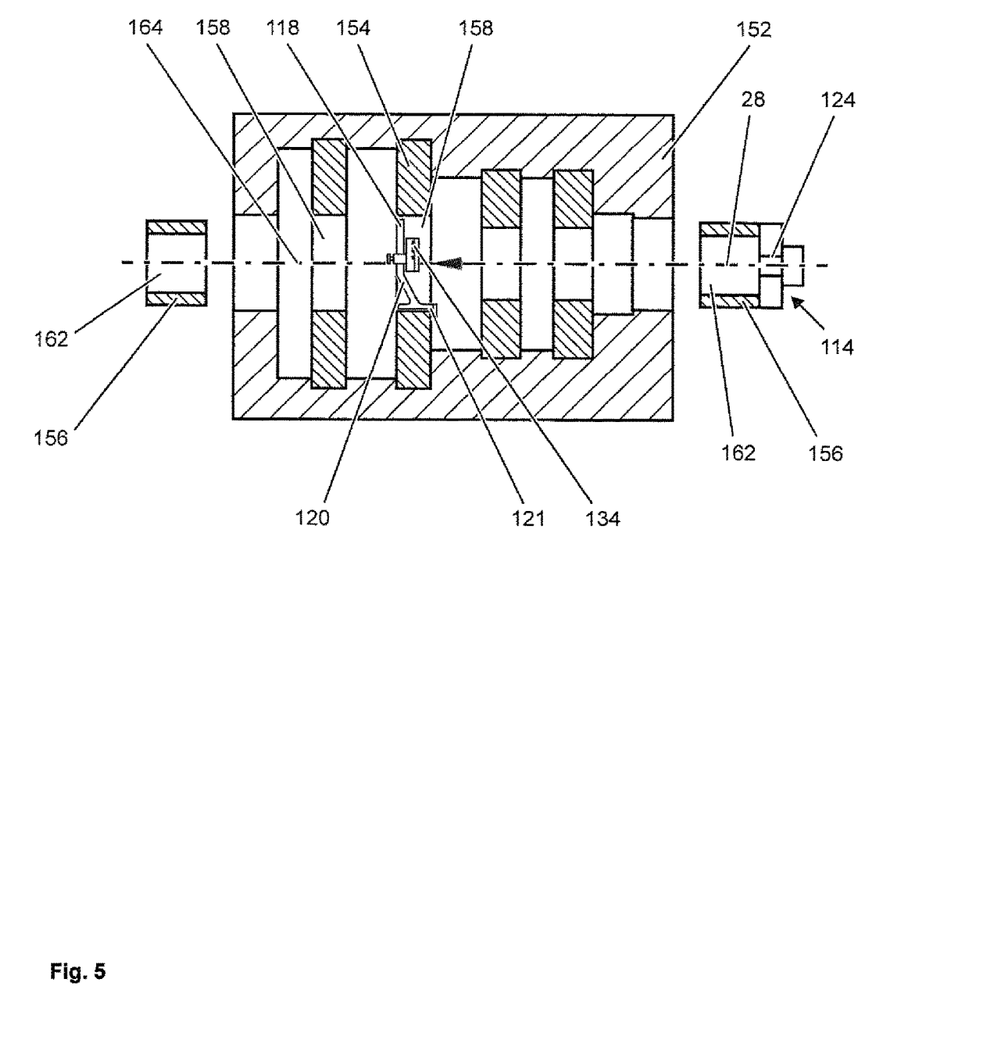
FIG. 5 a lengthwise sectional view of a turbine stator that is measured by means of a device according to the invention.
Figure 6:
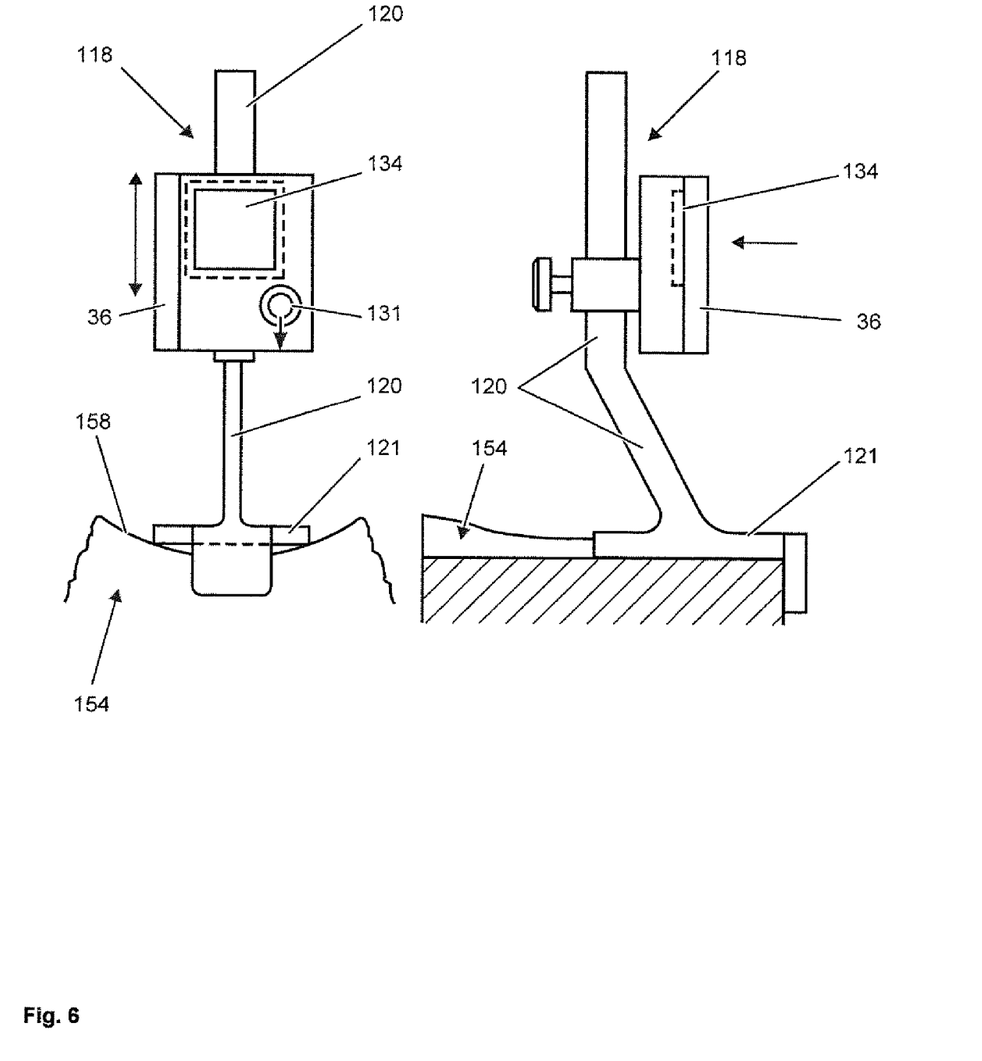
FIG. 6 a measurement unit of the device of FIG. 5 to be positioned at the inner wall in frontal and lateral view.

Shown in FIGS. 5 and 6 is an example of how a first measurement unit 114 and a second measurement unit 118 can be used for determining the alignment of parts of a turbine stator 152, namely of impeller wheel rims 154 with respect to turbine rotor bearings 156, which are to be adjusted so that the center lines of curvature of the cylindrical walls 158 of the central openings 160 of the impeller wheel rims 154 and the central lines of curvature of the cylindrical bearing surfaces 162 of the turbine rotor bearings 156 align with one another. To this end, the first measurement unit 114 is positioned at the rotor bearing 156, seen on the right in FIG. 5, in such a way that the light beam bundle 128 produced by the light source 124 is emitted roughly parallel to the final, still to be adjusted rotor rotational axis 164 through the measurement space enclosed by the opening walls 158 of the impeller wheel rims 154.

The second measurement unit 118 is joined via a spacer 120 to a foot 121, which is positioned at the inner wall 138 of the central opening 160 of one of the impeller wheel rims 154 so that the light beam 128 impinges on the scattering surface 134 of the second measurement unit 118. The second measurement unit 118 can be designed similarly to the second measurement unit of FIGS. 1 to 3 with laterally attached camera 36 in order to take pictures of the scattering surface 134 so as to determine the location of the point of impingement PV of the light beam 128. The foot 121 is provided for tilt-resistant, sliding support against the wall 158, with it being possible for the second measurement unit 118 to shift in the peripheral direction in order to take pictures of the scattering surface 134 at different rotational angles of the second measurement unit 118. For this purpose, the foot 121 is designed such that it can be set in the respective measurement position with respect to the wall 158 by being designed as a magnetic foot, for example. Preferably, the second measurement unit 118 comprises an inclinometer 131 for determination of the rotational angle.

By determining the point of impingement of the beam of light 128 for at least three different rotational angles, it is possible to determine the alignment of the inner wall 158 with respect to the light beam 128 and hence with respect to the reference axis of the rotor bearings 156; such a method is described in EP 0 543 971 B1, for example.

Figure 7:
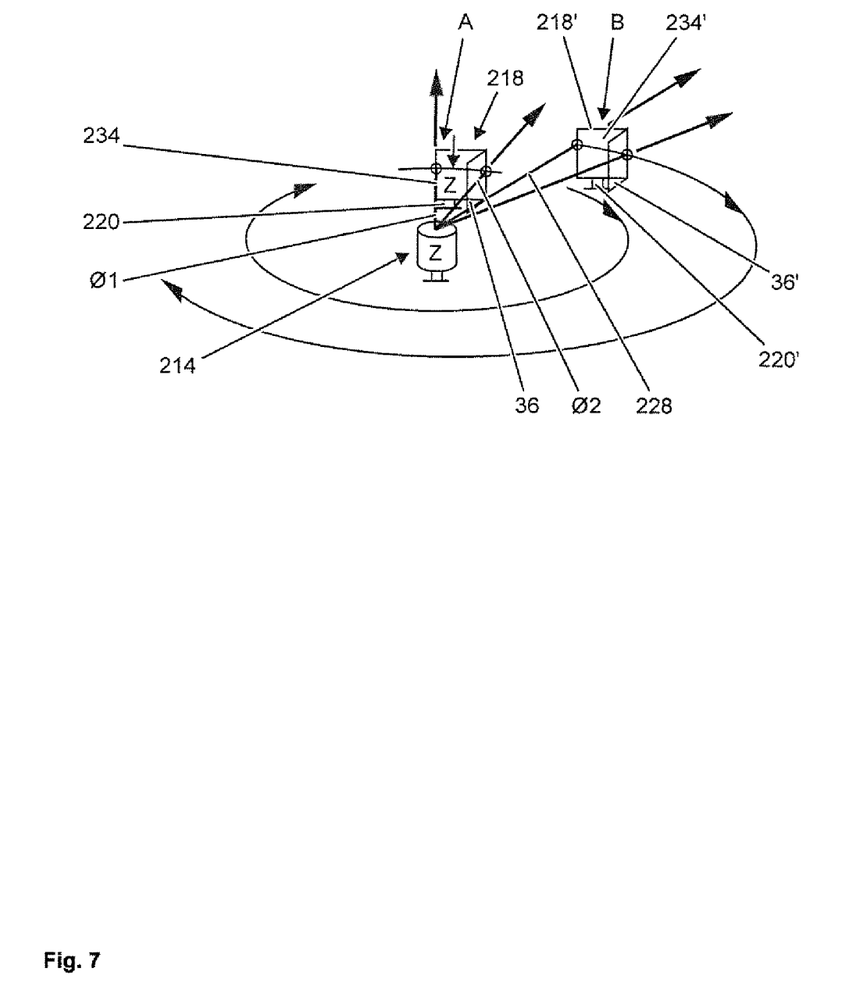
FIG. 7 an example of the use of a measurement device according to the invention for a level measurement.

Shown in FIG. 7 is an alternative application of a location determination device according to the invention, in which a first measurement unit 214 and a second measurement unit 218 are used for level measurement of measurement points on a surface to be measured. The first measurement unit 214 is designed in this case such that it produces a light beam 228 rotating around a vertical axis in a horizontal plane, said light beam typically rotating at constant angular speed and thereby periodically sweeping the scattering surface 234 of the second measurement unit 218 in an essentially horizontal direction. Here, too, the second measurement unit 218 can be designed similarly to the measurement unit 18 from FIGS. 1 to 3 or the measurement unit 118 from FIG. 5 with a laterally attached camera 36.

For such a level measurement, at least one image of the scattering surface 234 is taken, which is then analyzed in terms of the point of impingement of the light beam 228 in order to determine a difference in level compared to earlier measurement positions for which the second measurement unit 218 or the foot 220 of the measurement unit 218 was positioned at another place on the surface to be measured (in FIG. 7, a first measurement position is indicated by A and a second measurement position by B).

Figure 8:
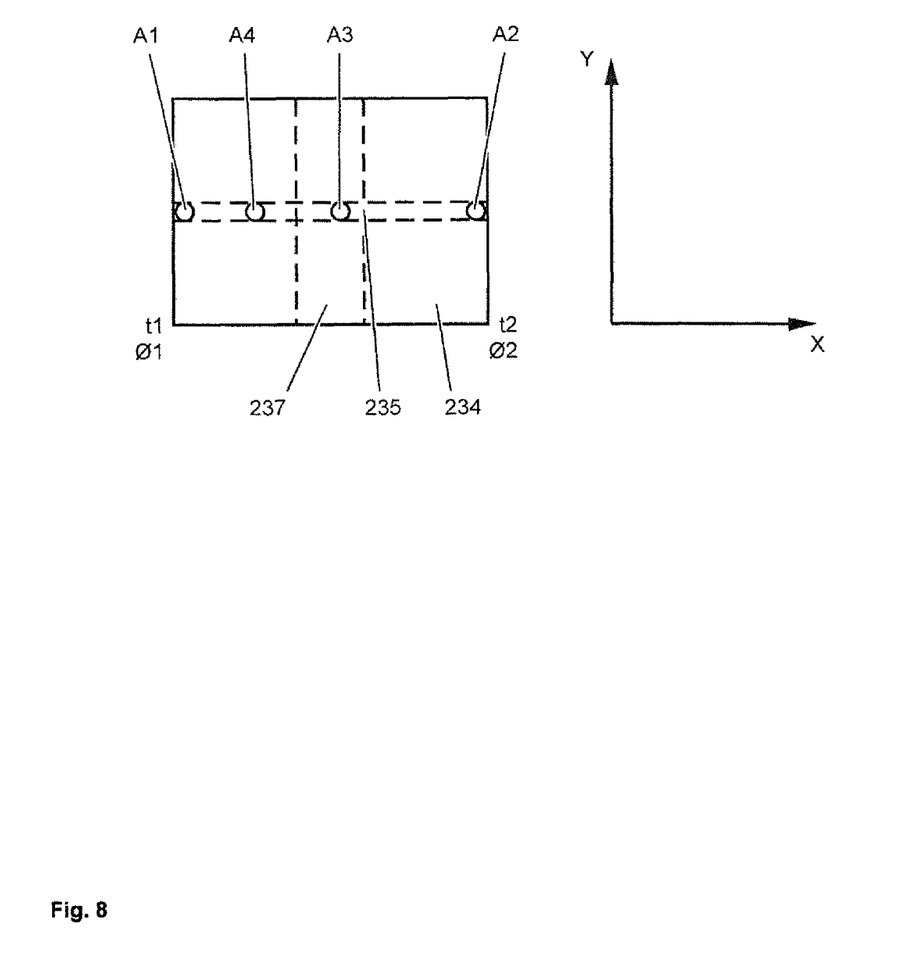
FIG. 8 examples of images taken with the device of FIG. 7.

Shown in FIG. 8 is a schematic example of how the point of impingement of the light beam 228 sweeps the scattering surface 234 in the horizontal direction. In the process, at the time point $t_1$, which corresponds to a rotational angle $\phi_1$, the light beam 228 impinges at a point A1 on the left edge of the scattering surface 234, said point then migrating in the horizontal direction over the scattering surface 234 in a strip 235, and, at the time point $t_2$, which corresponds to a rotational angle $\phi_2$, once again leaving the scattering surface 234 at a point A2. When the rotational speed ω of the light beam 228 is held quite constant, there results a good correlation between time and rotational angle.

When the scattering surface 234 is then recorded by means of the camera 236, there are various possibilities, which can be seen on the images, these possibilities depending on the time point when the picture was taken and the length of the exposure. When the length of the exposure is relatively long in comparison to the rotational speed ω, essentially a horizontal streak is to be seen on the image, the length of which, insofar as it does not extend over the entire width of the image, depends on the exposure time and the rotational speed ω. For shorter exposure times, a point or a circle or a horizontal ellipse is formed instead.

Several possible recording modes will be described below.

According to a first variant, the camera 36 can be operated in a (quasi) video mode, in which, at regular intervals of time, that is, with a specific frame rate, an image of the scattering surface 234 is taken, and in which only images for which the point of impingement of the light beam 228 lies in a predetermined region of the scattering surface 234 (this region is indicated with reference 237 in FIG. 8) are then analyzed. In the example of FIG. 8, this condition is fulfilled for the point of impingement A3, but not for the point of impingement A4. The predetermined region 237 typically lies in this case roughly at the center of the x direction of the scattering surface 234. For images in which the point of impingement lies in the region 237, the y coordinate of the point of impingement is then analyzed in order to obtain the vertical level of the measurement position. Such an analysis of the y coordinate of the point of impingement is also possible in the case when the point of impingement in the image is smeared in the horizontal direction, in which case it is possible to obtain here additionally a leveling angle of the scattering surface 234, which corresponds to the tilting of the "streak" with respect to the horizontal.

In an alternative recording mode, the camera is not set in a video mode, but rather has a trigger function, which causes the camera 36 to take a picture of the scattering surface 234 only in the case when the point of impingement of the light beam 228 lies in a predetermined region—for example, in the region 237—of the scattering surface 234. In this way, it is possible to avoid the effort of specifically choosing a certain image after the pictures are taken, as is the case for the first described recording mode.

Furthermore, the camera 36 can be joined to the first measurement unit 214 by means of a wireless data link (for example, a Bluetooth link) in order to transmit data regarding rotational frequency and rotational angle of the light beam 228 from the first measurement unit 214 to the camera 36, with it being possible for the camera, if need be, to control also the rotational frequency of the light beam 228 via this wireless data link. Such a data link can be exploited according to a first example to the extent that the camera takes pictures of the scattering surface 234 at a fixed frame rate (that is, in a (quasi) video mode) and the rotational frequency is adjusted by the camera 36 via the data link so that two of the images taken (typically two successively taken images) each show a point of impingement of the light beam 228 on the scattering surface 234 that is displaced as far as possible horizontally from the other point (this would be fulfilled in FIG. 8, for example, for images with the points of impingement A1 and A2). In this case, the horizontal separation of the two points of impingement is determined and, from the frame rate, the rotational frequency, and the horizontal separation of the two points of impingement, it is possible to calculate the (radial) separation of the second measurement unit 218 from the first measurement unit 214. In this process, in the event that the point of impingement is smeared, a line of best fit is calculated in each case and, through center of gravity calculation, the horizontal separation of the points of impingement can be determined.

When the separation of the second measurement unit 218 from the first measurement unit 214 is essentially greater than the horizontal separation of the two points of impingement, the horizontal separation of the points of impingement corresponds roughly to the arc length; the rotational angle φ can be determined precisely from the predetermined rotational frequency ω of the light beam 228 and the inverse of the frame rate of the camera 36, so that the radius, that is, the distance between light source 224 and scattering surface 234 can then also be determined. Insofar as the rotational angle φ of the first measurement unit 214 is transmitted to the camera 36, the relative angular position of the scattering surface 234 is also known, so that both the angular position of the measurement position and also its distance from the first measurement unit 214, together with the level of the measurement position, can be determined.

In another alternative embodiment, an image with a smeared point of impingement can be taken by suitable choice of the exposure time and rotational frequency, with the horizontal length of the smear being determined and, from it, on the basis of the exposure time of the image and the rotational frequency of the light beam 228, the distance between the second measurement unit 218 and the first measurement unit 214.

In another modification of the device of FIGS. 1 to 3, the device of FIGS. 1 to 3 is designed to determine the straightness of a body. In this case, the measurement units 18, 22 have, instead of the elements 20 for positioning at the respective peripheral surface of the shafts 10, 14, elements for form-fitting surface positioning at a surface of the body to be measured. Straightness deviations of the surface to be measured in this case lead to tilting or twisting of the measurement units 18, 22 relative to one another, which leads to a corresponding shift in the point of impingement of the light beam 28 on the scattering surface 34, from which the corresponding straightness deviations of the surface to be measured can be determined. The measurement units can be shifted over the surface to be measured in order to measure the entire surface.

Figure 9:
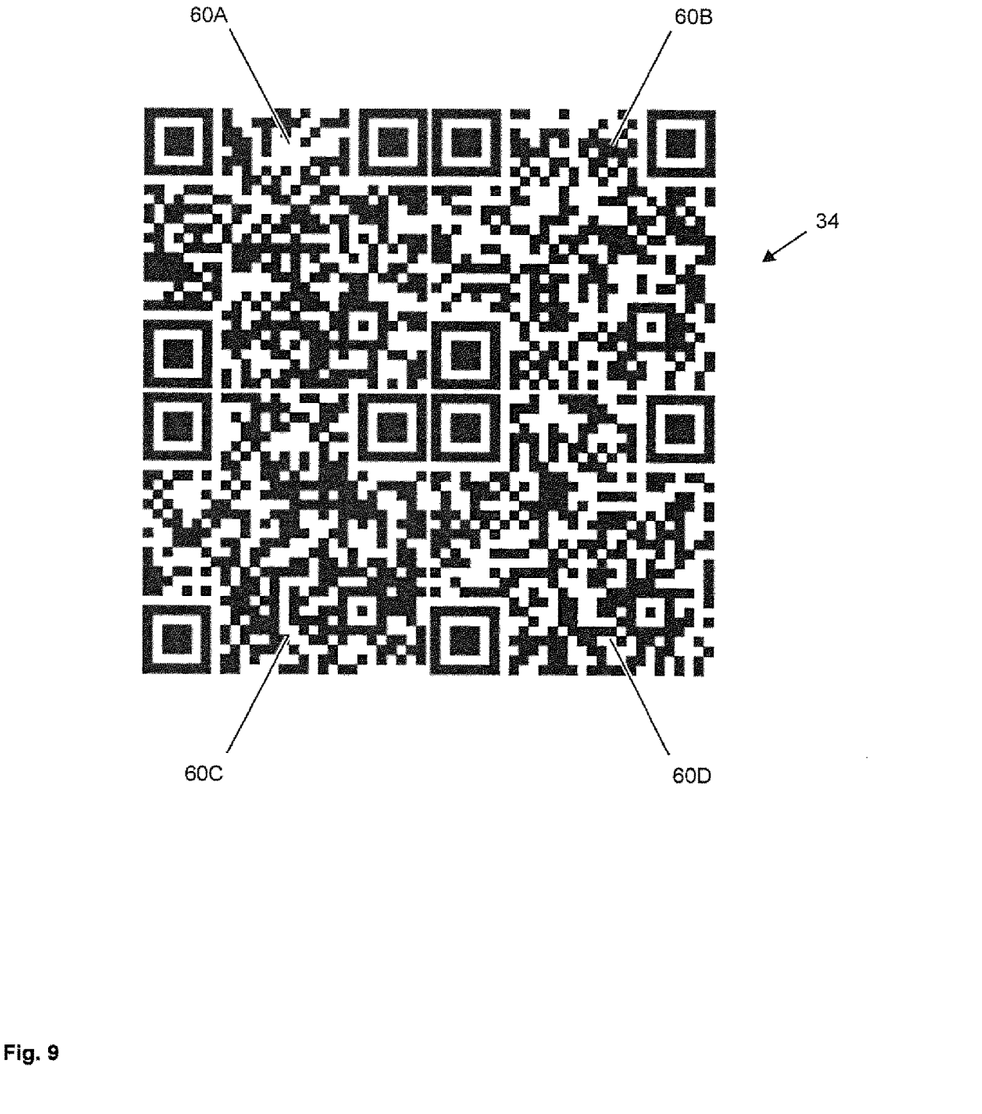
FIG. 9 an example of a scattering surface provided with four QR codes.

According to an embodiment of the invention, the scattering surface can be provided with a plurality of two-dimensional optical codes—such as, for example, a QR code—which are distributed over the scattering surface, typically in the manner of a grid, which are imprinted on the scattering surface and serve for coding of information/data regarding the scattering surface or the measurement unit provided with the scattering surface, such as, for example, the serial number of the measurement unit, the dimensions of the scattering surface in the x and y directions (for example, in mm), correction factors regarding the precision or errors of the printer used for imprinting the scattering surface (for example, amount of extension or compression in the x and y directions), the number of codes on the scattering surface, the position of the respective code in the grid (row number, column number), as well as the distance of the respective code from the origin of the coordinate system of the scattering surface (for example, in μm). In this case, the individual codes can be arranged in such a way that they are adjacent to one another so as to cover the entire scattering surface; see, for example, FIG. 9, where four codes 60A, 60B, 60C, 60D are shown. The number and resolution of the codes should be optimized in correspondence to the resolution of the printer and the camera. Instead of a QR code, it is basically possible to use other proprietary graphic codes as well.

The provision of graphic codes on the scattering surface has the following advantages: The entire reflector surface together with protective edge does not need to be photographed, which means facilitation for the user. The codes can be reconstructed to produce a target image, so that sufficient points are available for linearization of the image of the scattering surface (inner and outer parameters). The codes on the scattering surface can be identified as such on the basis of specific markings. A higher precision in determining the position of impingement can be achieved. The scattering surface can be corrected in regard to the precision of the printer used for imprinting of the scattering surface.

It would be appreciated by those skilled in the art that various changes and modifications can be made to the illustrated embodiments without departing from the spirit of the present invention. All such modifications and changes are intended to be covered by the appended claims.

What is claimed is:

1. A device for determining the location of a first mechanical element (10, 156) and a second mechanical element (12, 154) with respect to each other, comprising:
   a first measurement unit (14, 114, 214) for positioning at the first mechanical element, the first measuring unit configured and arranged to produce light beam bundle (28, 124, 224);
   a second measurement unit (18, 118, 218) for positioning at the second mechanical element, the second measuring unit further comprising a scattering surface (34, 134, 234) for the scattering of light impinging on the scattering surface from the first measuring unit;
   a camera (36)-configured and arranged to take pictures of the side of the scattering surface facing the first measurement unit; and
   an analysis unit (22);
   wherein the scattering surface faces the first measurement unit when the measurement units are positioned at the respective mechanical element so as to be impinged on by the light beam bundle from the first measuring unit;
   the analysis unit being configured and arranged to determine from image data supplied by the camera, from pictures taken by the camera, the position of impingement of the light beam bundle, emitted by the first measurement unit, directly onto the scattering surface without reflection and from it the location of the first mechanical element and the second mechanical element with respect to each other.

2. The device according to claim 1, wherein the camera (36) is arranged laterally displaced with respect to the scattering surface (34, 134, 234) or the camera (36) is arranged displaced laterally and tilted relative to the scattering surface (34, 134, 234).

3. The device according to claim 1, wherein the second measurement unit (18, 118, 218) is configured and arranged for the detachable fastening of the camera (36) and/or in configured and arranged for imaging the scattering surface (34, 134, 234) on the camera (36) involves a lens with fixed focus and/or the camera (36) is configured and arranged (23) for illuminating the scattering surface (34, 134, 234) an/or in that the camera (36) is mounted on an optical shield forming a scattered light aperture.

4. A device for determining the location of a first mechanical element (10, 156) and a second mechanical element (12, 154) with respect to each other, comprising:
   a first measurement unit (14, 114, 214) for positioning at the first mechanical element, the first measurement unit is configured and arranged (24, 124, 224) for producing a light beam bundle (28, 128, 228);
   a second measurement unit (18, 118, 218) for positioning at the second mechanical element, the second measurement unit has a scattering surface (34, 134, 234) for the scattering of light impinging on the scattering surface;
   the scattering surface facing the first measurement unit when the measurement units are positioned at the respective mechanical element so as to be impinged on by the light beam bundle;
   a camera (36) being freely movable with respect to the two measurement units and is configured and arranged for taking pictures of the side of the scattering surface facing the first measurement unit; and
   an analysis unit (22);
   the analysis unit configured and arranged to determine from image data supplied by the camera, from pictures taken by the camera, the position of impingement of the light beam bundle, emitted by the first measurement unit, directly onto the scattering surface without reflection and from it the location of the first mechanical element and the second mechanical element with respect to each other.

5. The device according to claim 1, wherein the analysis unit (22) is configured and arranged to rectify the image data supplied by the camera (36) with respect to a tilting to the scattering surface (34, 134, 234) and/or the scattering surface (34, 134, 234) is substantially flat and/or the second measurement unit (18, 118, 218) has a backlighting (25) for the scattering surface (34, 134, 234) and/or the camera (36) is configured and arranged as a smartphone and/or the first mechanical element is a first shaft (10) and the second mechanical element is a second shaft (12), with the first measurement unit (14) being configured and arranged for positioning at a peripheral surface of the first shaft and the second measurement unit (18) being configured and arranged for positioning at a peripheral surface of the second shaft.

6. The device according to claim 5, wherein the analysis unit (22) is configured and arranged to determine the angular offset and the vertical and horizontal offset of the shafts from image data taken in different rotational angle positions of the shafts (10, 12) and/or the camera (36) has an inclinometer (29).

7. The device according to one of claim 1, wherein the first measurement unit (214) for producing the light beam bundle (228) is configured and arranged to produce the light beam bundle around a vertical axis (z) rotating in a horizontal plane or the first measurement unit (14, 114, 214) and/or second measurement unit (18, 118, 218) are configured and arranged so that they can be shifted along an edge or surface of the first or second mechanical element, and wherein the analysis unit is configured and arranged to determine the straightness of the edge or surface of the first or second mechanical element from image data acquired along the edge or surface in different positions of the measurement units or in that the second mechanical element has a concave cylindrically curved body surface (158), wherein the second measurement unit (218) is configured and arranged so that it can be shifted in the peripheral direction of the body surface for the purpose of acquiring image data in different rotational angle positions of the second measurement unit, and wherein the analysis unit (22) is designed to determine from the image data the angular offset and vertical and horizontal offset of the body surface with respect to a predetermined reference direction through the light beam bundle (228).

8. The device according to claim 7, wherein the first measurement unit (214) for producing the light beam bundle (228) is configured and arranged to produce the light beam bundle around a vertical axis (z) rotating in a horizontal plane and the analysis unit (22) is configured and arranged to determine a vertical level difference between the first mechanical element and the second mechanical element from the image data.

9. The device according to claim 1, wherein the scattering surface (34, 134, 234) is configured and arranged to be non-transparent for the light beam bundle (28, 128, 228) and/or in that the scattering surface (34, 134, 234) is provided with measurement markings (50) and/or the scattering surface (34, 134, 234) is provided with a plurality of graphic codes (60A, 60B, 60C, 60D), distributed over the scattering surface, for coding of data regarding the scattering surface and/or the measurement unit provided with the scattering surface.

10. A method for determining the location of a first mechanical element (10, 156) and a second mechanical element (12, 154) with respect to each other, comprising the steps of:
  positioning a first measurement unit (14, 114, 214) at the first mechanical element and a second measurement unit (18, 118, 218) is positioned at the second mechanical element;
  producing a light beam bundle (28, 128, 228) by the first measurement unit and is directed, directly impinged without reflection, onto a scattering surface or a scattering surface (34, 134, 234) of the second measurement unit facing the first measurement unit;
  bringing a camera (36), that can move freely with respect to the two measurement units, into position and taking at least one picture of the scattering surface or taking at least one picture of the scattering surface by a camera (36) introduced at the second measurement unit and directed onto the scattering surface; and
  analyzing the at least one picture to determine the position of impingement (PV, A1, A2, A3: A4) of the light beam bundle impinged onto the scattering surface and from it the location of the first mechanical element and the second mechanical element with respect to each other.

11. The method according to claim 10, wherein the camera (36) is directed onto the side of the scattering surface (34, 134, 234) facing the first measurement unit (14, 114, 214) and/or the scattering surface (34, 134, 234) is configured as a matt screen and the camera (36) is directed onto the side of the matt screen facing away from the first measurement unit (14, 114, 214).

12. The method according to claim 10, wherein the light beam bundle (228) is produced around a vertical axis (z) rotating in a horizontal plane and, from the picture, a vertical level difference between the first mechanical element and the second mechanical element is determined.

13. The method according to claim 12, wherein the camera (36) is operated in a mode in which, at regular intervals in time, a picture of the scattering surface is taken, but wherein only pictures for which the point of impingement (A3) of the light beam bundle lies in a predetermined region (237) of the scattering surface are analyzed or in that the camera (36) has a trigger function, which causes the camera to take a picture of the scattering surface (234) in each case only when the point of impingement (A3) of the light beam bundle (228) lies in a predetermined region (237) of the scattering surface.

14. The method according to claim 13, wherein the camera (36) is joined to the first measurement unit (214) by a wireless data link to transmit data regarding rotational frequency and rotational angle from the first measurement unit to the camera (36).

15. The method according to claim 14, wherein the camera (36) is configured and arranged to control the rotational frequency of the light beam bundle via the data link or from a picture of the camera (36) in which the point of impingement of the light beam bundle (228) onto the scattering surface is depicted in a horizontally smeared way (235), the horizontal length of the smear is determined and, from this, based on the exposure time of the picture and the rotational frequency of the light beam bundle, the distance of the second measurement unit (218) from the first measurement unit (214) is calculated or in that the camera (36) can control the rotational frequency of the light beam bundle via the data link and the camera (36) takes pictures of the scattering surface (234) at a fixed frame rate and the rotational frequency is adjusted by the camera via the data link so that two of the pictures show a point of impingement (A1, A2) of the light beam bundle onto the scattering surface that is displaced as far as possible horizontally with respect to each other, wherein the horizontal distance between the two points of impingement is determined, and wherein the distance of the second measurement unit from the first measurement unit is calculated from the frame rate, the rotational frequency of the light beam bundle, and the horizontal distance between the two points of impingement.

* * * * *